US00RE35067E

United States Patent [19]

Bauknecht

[11] E Patent Number: Re. 35,067

[45] Reissued Date of Patent: Oct. 17, 1995

[54] BI-DIRECTIONAL REGISTRATION OF SERVO INDEXED WEBS

[75] Inventor: Donald J. Bauknecht, Green Bay, Wis.

[73] Assignee: FMC Corporation, Chicago, Ill.

[21] Appl. No.: 37,638

[22] Filed: Mar. 19, 1993

Related U.S. Patent Documents

Reissue of:

[64] Patent No.: 5,000,725
Issued: Mar. 19, 1991
Appl. No.: 267,866
Filed: Nov. 7, 1988

[51] Int. Cl.[6] ..... B31B 1/08

[52] U.S. Cl. ..... 493/11; 493/22; 493/24; 493/29; 226/32; 364/469; 364/474.09

[58] Field of Search ..... 493/2, 3, 11, 22, 493/24, 29, 194–196; 226/27, 32; 83/209, 72, 75, 367; 364/469, 474.09

[56] References Cited

U.S. PATENT DOCUMENTS

| | | | |
|---|---|---|---|
| 3,375,961 | 4/1968 | Flick | 226/32 |
| 3,713,571 | 1/1973 | Simonton | 226/32 |
| 4,737,904 | 4/1988 | Ominato | 364/474.09 |
| 4,781,317 | 11/1988 | Ditto | 226/27 |
| 4,782,987 | 11/1988 | Giacomelli | 226/27 |
| 5,041,070 | 8/1991 | Blaser | 226/27 |

FOREIGN PATENT DOCUMENTS

| | | |
|---|---|---|
| 54-42266 | 4/1979 | Japan . |
| 57-51446 | 3/1982 | Japan . |
| 0248932 | 2/1990 | Japan . |
| 0263729 | 3/1990 | Japan . |

*Primary Examiner*—Jack W. Lavinder
*Attorney, Agent, or Firm*—Douglas W. Rudy; Warren N. Low

[57] ABSTRACT

A bag machine fabricates plastic bags by transversely cutting and sealing, at regularly spaced preselected locations, an elongate plastic web having graphic material repetitively printed thereon. In operation, the bag machine advances the web by a calculated draw length, and an optical sensor, sensitive to the passage of eyemarks printed in regularly spaced locations on the web, functions to ensure that the web is cut and sealed only at the desired locations. To avoid inaccuracies resulting from a gradual variance between the nominal draw length and the actual distance between eyemarks, a control system monitors the actual distance between eyemarks and sets the nominal draw length to the average actual spacing between eyemarks as measured over a preselectd number of successive eyemarks.

28 Claims, 3 Drawing Sheets

FIG_3
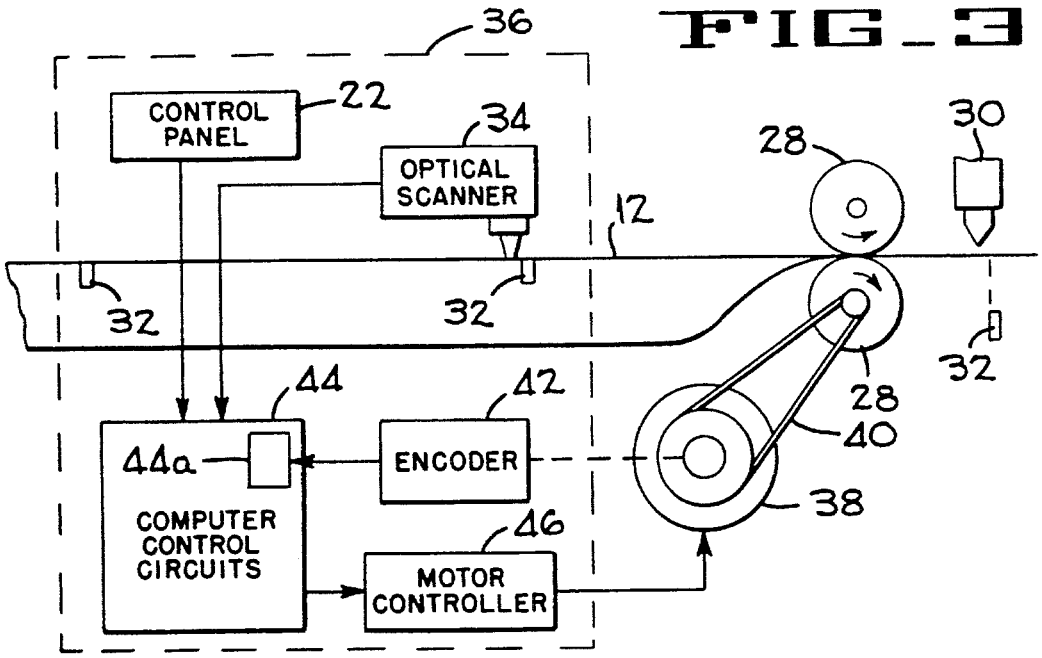
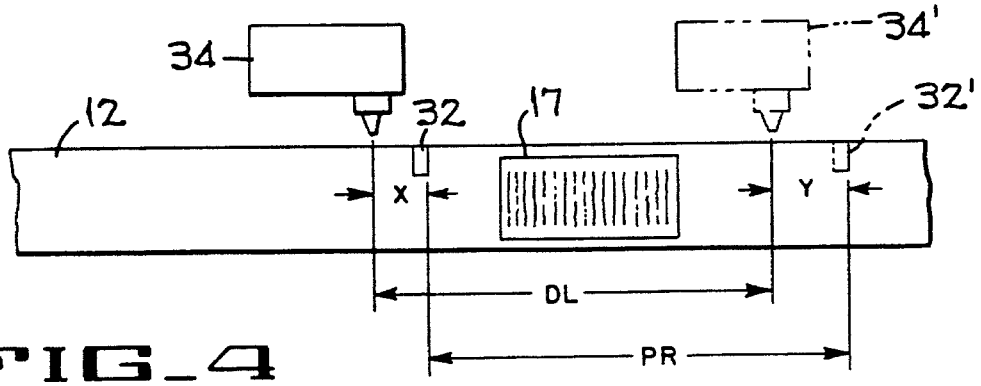
FIG_4
FIG_5
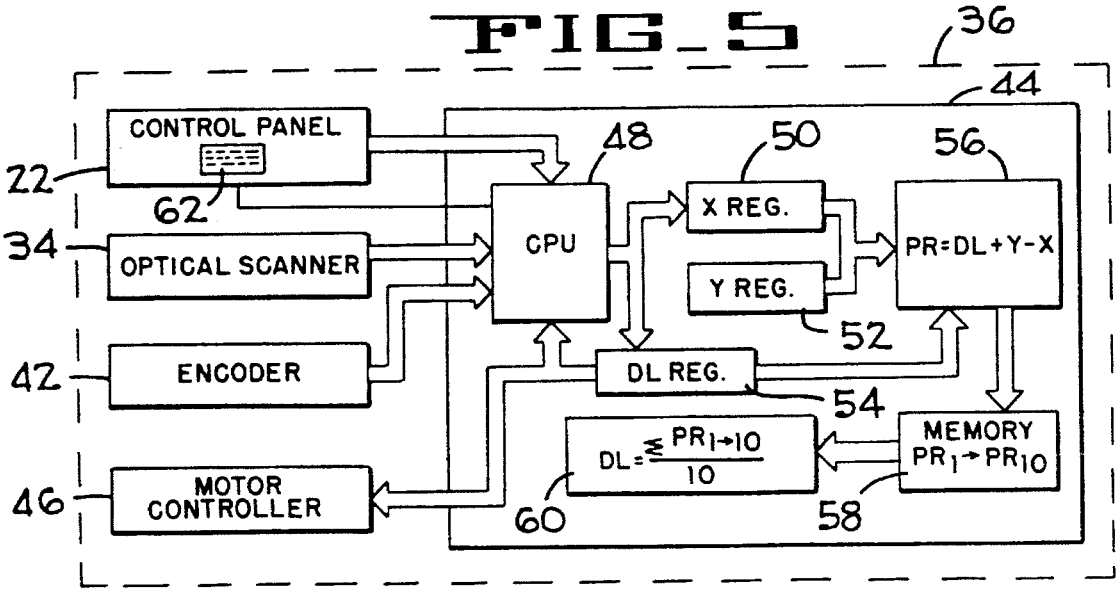

START
READ INITIAL DRAW LENGTH
GO ?
NO
YES
LAST 1/2 INCH OF DRAW LENGTH ?
NO
YES
YES
SEE LEADING EDGE OF EYEMARK ?
NO
MOTOR RUNNING ?
YES
NO
ZERO ENCODER
MOTOR RUNNING ?
YES
NO
R1=ENCODER
R1<.03 (NO EYEMARK) ?
YES
SET NEXT DRAW LENGTH = DRAW LENGTH + 0.15
NO
R1<0.2 OR R1>0.3 ?
YES
R2=R2+1
R3=R3+PRINT REPEAT LENGTH
R2=10 ?
YES
NO
NO
SET R2=0, R3=0
SET NEXT DRAW LENGTH=DRAW LENGTH -R1+.25"
NEXT DRAW LENGTH=R3/10
SET R2=0, R3=0

BI-DIRECTIONAL REGISTRATION OF SERVO INDEXED WEBS

Matter enclosed in heavy brackets [ ] appears in the original patent but forms no part of this reissue specification; matter printed in italics indicates the additions made by reissue.

BACKGROUND OF THE INVENTION

This invention relates generally to plastic bag fabricating machines and more particularly to systems for controlling operation of such machines.

Various machines exist for automatically fabricating plastic bags with economy and speed. Typically, these machines operate by drawing a predetermined length of plastic web from a supply roll and thereafter transversely cutting and thermally sealing the web to form a bag.

Frequently, it is desired to have labels, instructions or similar graphic material appear on the finished bags. To this end, the graphic material is printed onto the plastic web in regularly spaced locations or fields, and it is necessary to ensure that the web is cut and sealed only at precise locations between the fields in order to insure proper placement of the printed matter on the finished bag.

One technique for ensuring that the web is cut and sealed at the proper locations is to advance the web by a predetermined distance, or draw length, equal to the spacing of the printed fields. However, minor errors, resulting from stretching or shrinkage of the web as it is printed and wound onto and off of the supply roll, accumulate and gross misalignment can occur over time as the bag fabricating machine operates. Another technique for ensuring that the web is cut and sealed at the desired locations between adjacent printed fields is to print regularly spaced indexing marks or "eyemarks" on the web before the web is fed into the bag fabricating machine. An optical sensor detects the passage of each eyemark by a predetermined location and signals the machine when to stop, cut and seal the web. However, it is often desired to include printed matter between. successive eyemarks. In order to avoid sensing other marks which appear to be eyemarks, it is preferred to enable the optical sensor only over a small interval or "window" in which the eyemark is expected to be seen.

This technique is effective in correcting minor systematic errors in alignment (such as, an intermittent lengthening or shortening of the actual distance between eyemarks). Progressive errors can arise as a result of varying tensions as the web is wound and unwound from the supply roll, and this can result in the eyemarks falling outside of the sensing window. These types of errors can cause improper alignment of the printed matter on the finished bags.

In view of the foregoing, it is a general object of the present invention to provide a new and improved plastic bag fabricating machine.

It is a more specific object of the present invention to provide a new and improved system for controlling the operation of a plastic bag fabricating machine so as to ensure proper alignment of printed matter on the finished bags.

It is a still more specific object of the present invention to provide a system for controlling the operation of a plastic bag fabricating machine so as to compensate for progressive variations between the nominal spacing of printed matter fields on the web and the actual spacings of the fields on the webs.

SUMMARY OF THE INVENTION

The invention provides a system for controlling the operation of a bag-making machine wherein a plastic web, having regularly spaced eyemarks printed thereon, is advanced by a predetermined draw length and then transversely cut and thermally sealed to form a bag. The control system includes structural features for sensing the passage of an eyemark by a predetermined location. Other structural features include means for determining the distance between the eyemark and the predetermined location when the web is stopped for cutting and sealing. The control system further includes structural futures for performing the following functions: determining the actual distance between adjacent eyemarks, calculating the average actual distance between the eyemarks over a predetermined number of consecutive eyemarks and setting the predetermined draw length substantially equal to the actual average distance between the eyemarks.

BRIEF DESCRIPTION OF THE DRAWINGS

FIG. 3 is a simplified block diagram of a control system for controlling operation of the bag machine;

FIG. 4 is a diagramatic view, useful in understanding operation of the control system, showing a plastic web in relation to an optical scanner included in the control system;

FIG. 5 is another block diagram showing in greater detail the control system shown in FIG. 3.

DESCRIPTION OF THE PREFERRED EMBODIMENT

Figure 1:
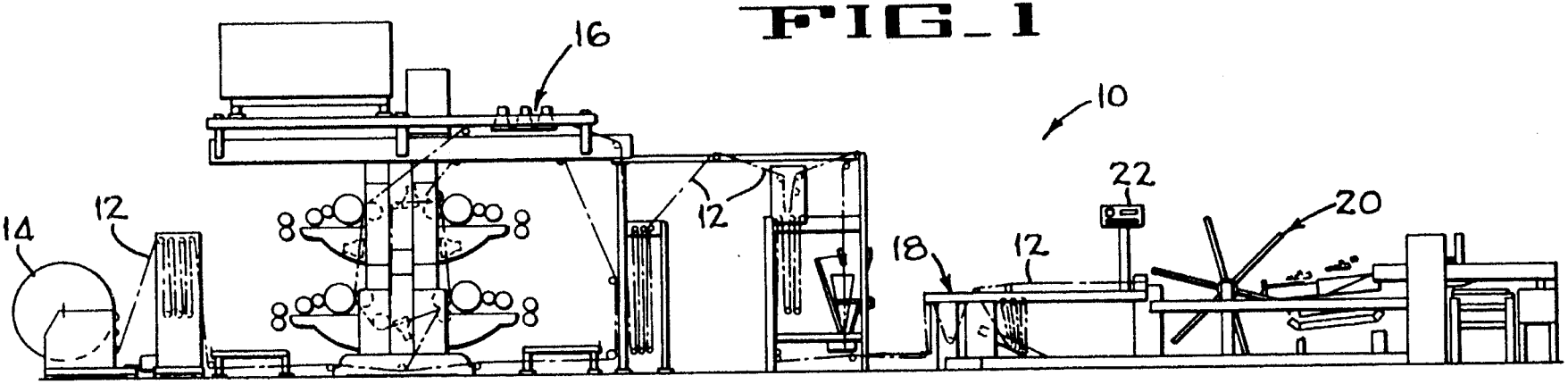
FIG. 1 is a side elevational view of a bag fabricating system including a bag machine operable to form plastic bags from plastic web.

A system 10 for automatically fabricating plastic bags from a continuous plastic web 12 is illustrated in FIG. 1. As shown, the system 10 includes a supply roll 14 containing the web 12, and an optional print mechanism 16 for repetitively printing graphic material 17 (FIG. 4) at regularly spaced locations on the web 12. The system 10 further includes a bag machine 18 for transversely cutting and sealing the web 12 to form individual plastic bags, and an optional stacker mechanism 20 for stacking the bags formed by the bag machine 18. A user-operable control panel 22 provides user-control over the automatic bag fabricating system 10.

Figure 2:
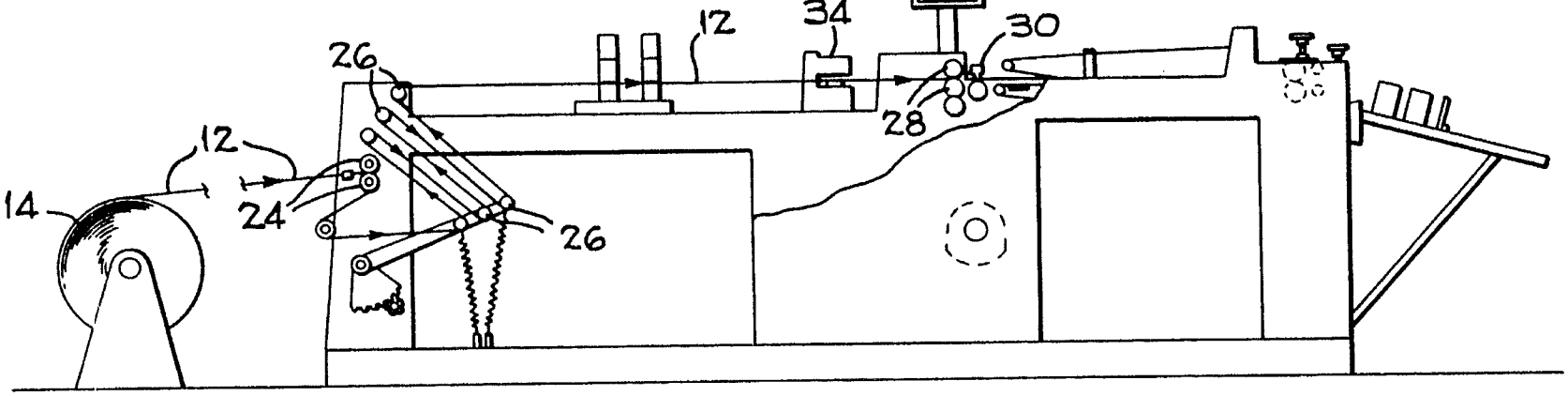
FIG. 2 is an enlarged side elevational view of a bag machine.

Referring to FIG. 2, web 12 is drawn from the supply roll 14 and is fed to the bag machine 18 where it is drawn forward between a pair of infeed rolls 24. After passing through the infeed rolls 24, the web 12 travels around a plurality of idler rollers 26 which function to maintain a substantially constant supply of the web 12. After passing through the idler rollers 26, the web 12 passes between a pair of draw rolls 28 positioned immediately upstream of a transverse cut and seal bar 30 which cuts and seals the web 12 to form the individual bags.

To ensure proper registration of the seal relative to the printed matter 17 on the web 12, a plurality of eyemarks 32 (FIG. 3) are printed at regular intervals along the edge of the web 12, and an optical scanner 34 photoelectrically senses the passage of each eyemark 32. Because other printed matter 17, detectible by the optical scanner 34, frequently appears between successive eyemarks 32, the optical scanner 34 is not continuously enabled but, rather, is enabled only for brief periods during which it is expected that an eyemark 32 should appear. In one embodiment of this invention the bag machine 18 advances the web 12 by a predetermined or calculated distance (DL) which, in this embodiment, is substantially equal to the nominal distance between the eyemarks 32, as set by the operator on the control panel 22 and as sensed by the optical scanner. Means for determining the actual spacing between successive one of the eyemarks includes the optical scanner, the encoder and the central processing unit (as will be explained further on) is provided. Additional means for setting the predetermined nominal draw length substantially equal to the actual measured spacing between sucessive ones of the eyemarks is also provided. To this end, in another embodiment the bag machine 18 advances the web 12 by a predetermined or calculated distance (DL), which, in the illustrated embodiment, it substantially equal to the nominal distance between the eyemarks 32, as set by the operator on the control panel 22, plus or minus a measured error quantity determined during the previous draw, plus one-half the width of the "window." The optical scanner 34 is then enabled only during a preset portion (e.g., the last one-half inch) of each advancement of the web 12. In this manner, the optical scanner 34 is only responsive to eyemarks 32 appearing within a definite zone or scanning "window".

The actual distance or spacing between eyemarks 32 can, for a number of reasons, vary from the nominal distance set by the operator on the control panel 22. For example, dimensional changes can result from the printing step itself, as well as from varying tensions as the web 12 is withdrawn from the roll 14 and advanced through the system 10. As a result, the eyemarks 32 can fall outside of the scanning "windows" and result misalignment of the printed matter 17 on the finished bags.

In accordance with one aspect of the invention, the bag machine 18 is provided with a control system 36 which automatically compensates for any progressive variation of the actual distance between eyemarks 32 from the nominal draw length set on the control panel 22.

Referring to FIGS. 3, 4 and 5, the control system 36 includes the control panel 22 and the optical scanner 34. The bag machine 18 includes an electrical servo motor 38 which is coupled, by means of a belt 40 or similar arrangement, to the draw rolls 28. The control system 36 further includes an encoder 42 which is directly coupled to the motor 38 and which functions to provide electrical pulses indicative of the rotation of the motor shaft (e.g., 4000 pulses per motor revolution). The signal generated by the encoder 42, as well as the signals developed by the control panel 22 and the optical scanner 34, are fed as inputs to computer control circuits 44. The computer control circuits respond to these inputs by instructing a motor controller 46 to drive the motor 38 so as to advance the web 12 a sufficient distance to provide a desired orientation of the eyemarks 32 relative to the transverse cut and seal bar 30. The computer control circuits 48 include a resemble counter 44a which counts the pulses developed by the encoder 42.

In accordance with another aspect of the invention, the control system 36 functions to sense the actual spacing between a predetermined number of successive eyemarks 32. In the event the distances of such actual spacings show a trend to deviate from the nominal draw length, the control system 36 functions to change the nominal draw length to be substantially equal to the average of the the actual spacings thus sensed. In this manner, the control system 36 functions to ensure that the eyemarks 32 continue to appear within the scanning "windows" even through the actual spacings between eyemarks tend to deviate from the nominal draw length. Because additional printed matter 17 may appear between the successive eyemarks 32, direct sensing of the distance between eyemarks is impractical and the actual distance between successive eyemarks is determined in accordance with the scheme illustrated in FIG. 4. In FIG. 4, the solid lines depict the relative positions of the optical scanner 34 and an eyemark 32 during a current bag-forming cycle, while the phantom figure depicts the relative positions of the optical scanner 34' and an eyemark 32' during the immediately preceding bag-forming cycle. The distance X is the distance the leading edge of the eyemark 32 went past the scanner 34 during the current bag-forming cycle, while the distance Y is the distance the leading edge of the next preceding eyemark 32 went past the scanner 34 during the immediately preceding bag-forming cycle. Distances X and Y are each determined by counting the pulses generated by the encoder 42 between the time the leading edge of and eyemark 32 is sensed and the time the web 12 is stopped for the cut and seal operation. The remaining distance, the calculated draw length DL, is the total distance the web 12 has been advanced for formation of the current bag. In the illustrated embodiment, DL is calculated in accordance with actual current operating conditions and is equal to the nominal draw length, plus or minus the error quantity measured during formation of the previous bag, plus one-half the width of the "window." It will be appreciated, however, that in other embodiments, the calculated draw length DL might be calculated in a different manner. Once these quantities are known, the actual distance or print repear length (PR) between the successive eyemarks 32 is given by the formula:

$$PR=DL+Y-X$$

In this manner, the actual distance or spacing between eyemarks 32 can be determined even through the optical scanner 34 is disabled over much of the distance traversed by the web 12 between the bag-forming cycles. The print repeat length PR thus calculated determines the draw length for the next bag forming cycle.

The control system 36 is illustreated in greater detail in FIG. 5. As shown, the computer control circuits 44 include a central processing unit (CPU) 48 which receives data from the control panel 22, the optical scanner 34 and the encoder 42. Also included are a first register 50 for storing the current distance X, a second register 52 for storing the previous distance Y, and a draw length register 54 for storing the nominal draw length initially entered on the control panel 22. Calculating means 56 (which may comprised part of a suitably programmed microprocessor-based computer system) are provided for calculating the print repeat length in accordance with the formula set forth above, and a memory 58 is provided for storing a plurality of consecutive print repeat lengths thus computed. In the illustrated embodiment, the memory 58 is configured to store ten such print repeat lengths $PR_1$ through $PR_{10}$, although it will be appreciated that a greater or lesser number can also be selected. From the memory 58, the print repeat lengths $PR_1$ through $PR_{10}$ are provided to a second calculating means 60 which computes a new nominal draw length equal to the average of the print repeat lengths $PR_1$ through $PR_{10}$. Once the new draw length has been thus calculated, it is loaded into the draw length register 54 and from the draw length register into the CPU 48 and the first calculating means In addition, the CPU 48 functions to display (e.g., on a cathode ray tube 62) the new nominal draw length at the control panel 22 to show the system operator that the nominal draw length has been automatically changed.

Figure 6:
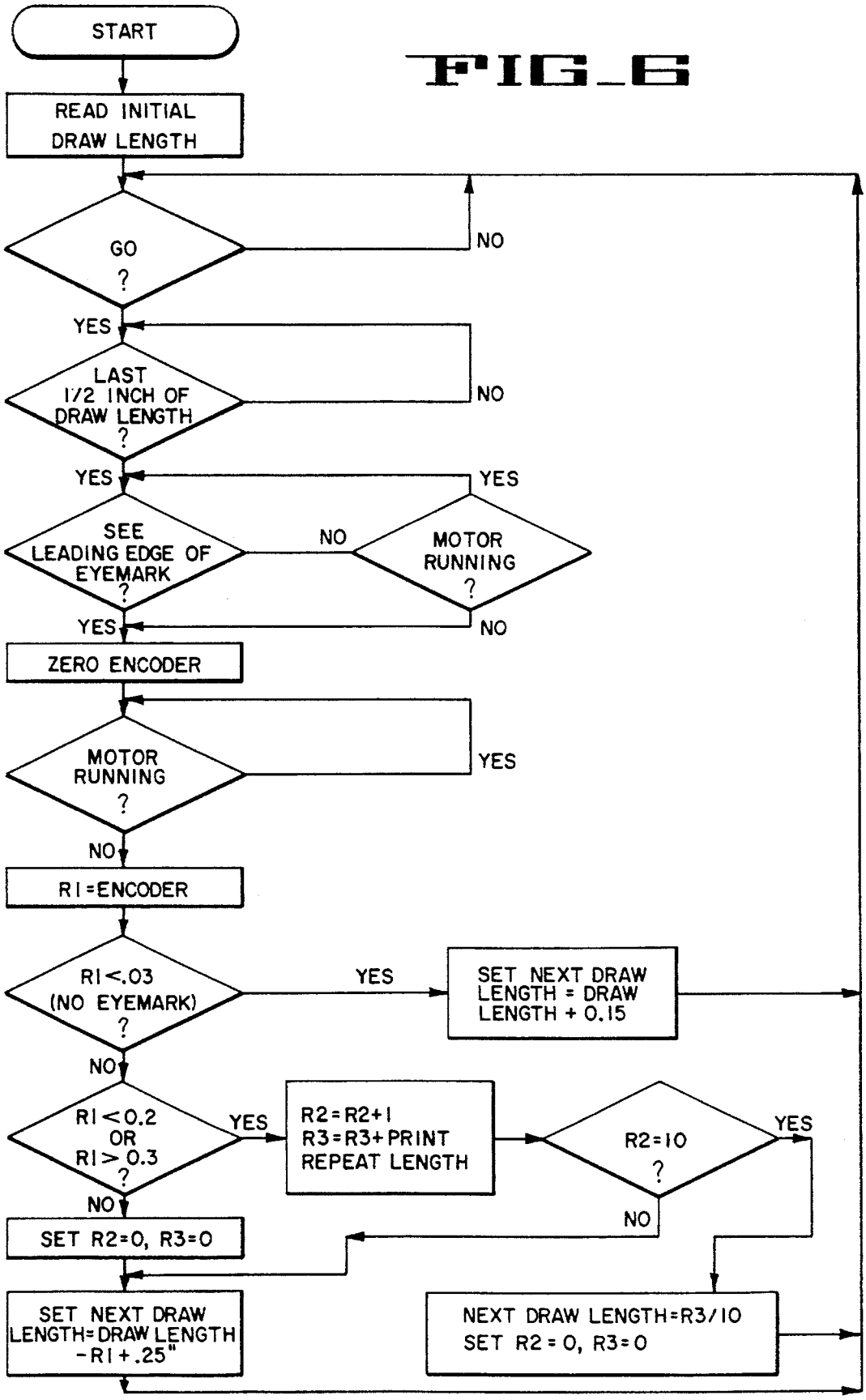
FIG. 6 is a flow chart diagram useful in understanding the operation of the control system.

The control system 36 of the present invention is preferably implemented utilizing microprocessor-based circuitry in conjunction with suitable programming. One possible program is exemplified by the flow chart diagram of FIG. 6. Referring to the FIG., the system 36, after receiving an instruction to begin operation, first reads and stores the nominal draw length entered by the system operator on the control panel 22. The control system then awaits the generation of a "go" signal from the CPU 48. When a "go" signal is received, the servo motor 38 starts and the system monitors the advancement of the web 12 by counting pulses from the encoder 42 until it is determined that the web 12 has been advanced to within a specified distance (one-half inch in this example) of the current calculated draw length. Once it has been determined that the web has been advanced to within the specified distance of the calculated draw length, the optical scanner is enabled and both the optical scanner 34 and the servo motor 38 are monitored until either the leading edge of the eyemark 32 is detected by the scanner 34 or the servo motor 38 stops running. When either event occurs, the encoder counter 44a is set to zero and the status of the servo motor 38 is ascertained. It will be appreciated that the specified distance sets the width of the scanning "window."

While the servo motor 38 is running, the system idles and the encoder count increases as the motor shaft rotates. When the servo motor stops running, thereby indicating that the web 12 has been advanced by the current calculated draw length, a constant R1 is set equal to the final encoder output. Accordingly, R1 represents the length by which the leading edge of the eyemark 32 is displaced from the optical scanner 34 when the web 12 has stopped.

In the event the eyemark 32 is not detected by the optical scanner 34 during the scanning "window", R1 will be substantially zero. If R1 is substantially zero (less than 0.03 inches in the example illustrated), the system 36 increase the next repeat length by a predetermined increment (0.15 inches in the illustrated example) and the system enters an idle to await the generation of a "go" signal. Thus, it will be appreciated that the length of each subsequent advancement of the web 12 will be the nominal repeat length plus 0.15 inches, and an eyemark 32 will eventually appear within the scanning window.

When an eyemark 32 does appear within the scanning "window," R1 will be non-zero. When the web 12 and the printed matter 17 thereon is in proper registration relative to the transverse cut and seal bar 30, the leading edge of the eyemark 32 should appear substantially midway between the limits or edges of the scanning "window". In the example illustrated, such proper registration is indicated by R1 having a value of substantially 0.25 inches or one-half the scanning window width. Accordingly, if R1 has a value between 0.2 inches and 0.3 inches, acceptable registration is indicated. In this event, a pair of additional variable constants R2 and R3, are set to zero and the next draw length is set equal to the nominal draw length, minus the current R1 value, and plus one-half the width of the scanning "window" (one-quarter inch in the illustrated example). By calculating the next draw length in this manner, compensation, in either direction, is automatically made for the small distance by which R1 differs from the distance representing perfect registration (0.25 inches in the illustrated example).

In the event R1 does not fail within the desired range (i.e., R1 is less than 0.2 inches or is greater than 0.3 inches in the illustrated example), the variable constant R3 is incremented by the print repeat length PR calculated in the manner described by reference to FIG. 4, and the variable constant R2 is incremented by one. R2 serves, therfore, to indicate the number of times that an eyemark has fallen within the scanning "window" but not within the desired range of the "window" midpoint.

R2 is next compared against a predetermined constant representing the number of consecutive times that R1 fails to fall within the desired range of the midpoint. In the illustrated example, ten such consecutive failures can occur before the system takes action to change or update the nominal draw length. As long as R2 remains less that the predetermined constant, the next or calculated draw length DL is set equal to the nominal repeat length, minus R1, and plus 0.25 inches. For this cycle, however, R2 and R3 are not set equal to zero and these values are retained as the system returns to await initiation of the next bag forming cycle.

In the event a discrepancy persists between the actual spacing between eyemarks and the nominal draw length, the variable constant R2 will eventually equal the predetermined constant (ten in the illustrated example). At the same time, the variable constant R3 will substantially equal the sum total of the actual distances between eyemarks over the preceding ten consecutive bag fabricating cycles when this occurs, the system 36 calculates the average actual distance between consecutive eyemarks 32 and changes the nominal draw length to the calculated average. Thereafter, the variable constants R2 and R3 are set to zero and the system recycles to await initiation of the next bag fabricating cycle.

It will be appreciated that only those actural distances that are determined as a result of an eyemark falling within the scanning "window" will be utilized in calculation of the average actual print repeat length. An eyemark can, for example, fail to appear within the scanning "window" as a result of improper synchronization of the web 12 relative to the bagging machine 18 rather than occuring as a result of an actual change in the eyemark spacing. As a consequence of the eyemark not appearing within the "window" due to asynchronization, the system 36 sets R2 and R3 to zero thus resetting the consecutive count and compelling the system to start over in its search for ten consecutive bags that are out of the midpoint range. Accordingly, any errors sufficient to place the eyemarks totally outside the scanning window will not be considered in calculating the average actual print repeat length. It can be seen that any bag that falls within the midpoint range will also reset R2 and R3 to zero as described above. In this manner the control system responds to gradual changes in eyemark spacing rather than to sudden or abrupt changes.

The system as shown and described herein automatically corrects for variations in the actual eyemark spacing of a plastic web used in the fabrication of plastic bags. Accordingly, the system reduces operator supervision and intervention, and ensures the fabrication of a high quality product by maintaining a desired orientation and position of printed matter on the finished bags.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a bag making machine having intermittently operated draw rolls coupled to a main shaft for rotation therewith, said draw rolls for, drawing by a predetermined nominal draw length, a web having printed thereon a series of regularly spaced eyemarks, the improvement comprising means, including an optical scanner for sensing said eyemarks, an encoder for determining motion of said main shaft and a central processing unit, for determining the actual spacing between successive ones of the eyemarks; and additional means for setting the predetermined nominal draw length for subsequent bags substantially equal to the actual spacing plus or minus a measured error quantity determined during the previous draw plus a portion of a scanning zone between subsequent successive ones of the eyemarks.

2. The improvement as defined in claim 1 wherein said additional means changes the predetermined nominal draw length only when the actual measured spacing between eyemarks differs from the predetermined nominal draw length by a predetermined difference.

[3. The improvement as defined in claim 1 further comprising display meads for indicating to an operator that the predetermined nominal draw length has been changed.]

4. The improvement as defined in claim 1 wherein said additional means calculates the average actual spacing between successive ones of a plurality of eyemarks and sets the predetermined nominal draw length to said average actual spacing.

5. The improvement as defined in claim 4 wherein said additional means changes the predetermined nominal draw length only when the spacing between each of the successive ones of the plurality of eyemarks exceeds said predetermined difference.

6. A control system for controlling the operation of a bag making machine of the type wherein a plastic web, having regularly spaced eyemarks printed thereon, is advanced by a predetermined draw length and stopped, the plastic web transversely cut and thermally sealed to form a bag, said control system comprising:

means for sensing the passage of an eyemark by a predetermined location;

means for determining the distance between the eyemark and the predetermined location when the web is stopped for cutting and sealing;

means for determining the [actural] *actual* spacing between adjacent ones of the eyemarks;

means for calculating the average actual spacing between the eyemarks over a predetermined number of consecutive eyemarks; and means for setting the subsequent predetermined draw length substantially equal to the average of said actual measured spacing plus or minus a measured error quantity determined during the previous draw plus a portion of a scanning zone between the eyemarks.

7. A control system as defined in claim 6 wherein said means for determining the actual spacing between adjacent ones of the eyemarks calculates the distance between adjacent ones of the eyemarks in accordance with the formula:

$$PR=DL+Y-X$$

where PR is the actual spacing between successive ones of the eyemarks, DL is the predetermined draw length, Y is the distance between an eyemark and the predetermined location when the web has been stopped for cutting and sealing, and X is the distance between the next subsequent eyemark and the predetermined location during the next subsequent stopping, cutting and sealing of the web.

8. A control system in accordance with claim 7 wherein the bag-making machine includes a motor for advancing the web, and wherein said means for determining the spacing between the eyemark and the predetermined location comprises an encoder coupled to the motor and operable to generate a signal indicative of motor revolution.

9. A control system as defined in claim 8 wherein said setting means changes the draw length only if said actual spacing between adjacent ones of the eyemarks differs from the predetermined draw length by a predetermined distance.

10. A control system in accordance with claim 9 further comprising a display for indicating to an operator that the predetermined draw length has been set substantially equal to said average actual spacing.

11. A plastic bag machine operable to form plastic bags from a plastic web having a plurality of regularly spaced eyemarks printed thereon, comprising;

a draw roll assembly operable to advance the web by a predetermined draw length;

an optical sensor operable to sense the passage of an eyemark by a predetermined location;

distance sensing means for sensing a deviation distance Y the sensed eyemark has moved beyond said predetermined location when the web has been advanced by said predetermined draw length;

a first register operable to store said deviation distance Y;

a second register operable to store the next subsequent deviation distance X sensed by said distance sensing means;

first calculating means for calculating a print repeat length in accordance with the formula:

$$\text{print repeat length}=DL+Y-X$$

wherein DL is the predetermined draw length;

second calculating means for calculating the average of a predetermined number of successive ones of said print repeat lengths calculated by said first calculating means; and control means for resetting the predetermined draw length to be substantially equal to said average print repeat length calculated by said second calculating means.

12. A plastic bag fabricating machine as defined in claim 11, wherein said draw roll assembly includes a motor and wherein said distance sensing means includes an encoder coupled to said motor and operable to provide a signal indicative of rotation of said motor.

13. A plastic bag fabricating machine as defined in claim 11 wherein said distance sensing means, said first and second registers, said fast and second calculating means and said control means comprise a microporcessor-based electronic control circuit.

14. A control system for controlling the operation of a bag making machine of the type wherein a plastic web, having regularly spaced eyemarks printed thereon, is advanced by a predetermined draw length and stopped, the plastic web transversely cut and thermally sealed to form a bag, said control system comprising:

means for sensing the passage of an eyemark by a predetermined location;

means for determining the distance between the eyemark and the predetermined location when the web is stopped for cutting and sealing;

means for determining the actual spacing between adjacent ones of the eyemarks;

means for calculating the average actual spacing between the eyemarks over a predetermined number of consecutive eyemarks; and means for setting the subsequent predetermined draw length substantially equal to the average of said actual measured spacing between the eyemarks.

15. A control system as defined in claim 14 wherein said means for determining the actual spacing between adjacent ones of the eyemarks calculates the distance between adjacent ones of the eyemarks in accordance with the formula:

$$PR=DL+Y-X$$

where PR is the actual spacing between successive ones of the eyemarks, DL is the predetermined draw length, Y is the distance between an eyemark and the predetermined location when the web has been stopped for cutting and sealing, and X is the distance between the next subsequent eyemark and the predetermined location during the next subsequent stopping, cutting and sealing of the web.

16. A control system in accordance with claim 15 wherein the bag making machine includes a motor for advancing the web, and wherein said means for determining the spacing between the eyemark and the predetermined location comprises an encoder coupled to the motor and operable to generate a signal indicative of motor revolution.

17. A control system as defined in claim 16 wherein said setting means changes the draw length only if said actual spacing between adjacent ones of the eyemarks differs from the predetermined draw length by a predetermined distance.

18. A control system in accordance with claim 17 further comprising a display for indicating to an operator that the predetermined draw length has been set substantially equal to said average actual spacing.

19. In a bag making machine having intermittently operated draw rolls couple to a main shaft for rotation therewith, said draw rolls for drawing, by a predetermined nominal draw length, a web having printed thereon a series of regularly spaced eyemarks, the improvement comprising means, including an optical scanner for sensing said eyemarks, an encoder for determining motion of said main shaft and a central processing unit for determining the actual spacing between successive ones of said eyemarks; and additional means for calculating the average actual spacing between successive ones of a plurality of eyemarks and sets the predetermined nominal draw length to *equal* said average actual spacing.

20. The improvement as deemed in claim 19 wherein said additional means changes the predetermined nominal draw length only when the spacing between each of the successive ones of the plurality of eyemarks exceed a predetermined difference.

21. The improvement in accordance with claim 19 further comprising display means for indicating to an operator that the predetermined nominal draw length has been changed.

22. The improvement in accordance with claim 19 wherein said additional means changes the predetermined nominal draw length only when the spacing between each of the successive ones of the plurality of eyemarks exceeds said predetermined difference.

*23. A machine having intermittently operated draw rolls coupled to a main shaft rotation therewith, said draw rolls for drawing by a predetermined nominal draw length, a web having printed thereon a series of regularly spaced eyemarks, the improvement comprising means including an optical scanner for sensing said eyemarks, an encoder for determining motion of said main shaft and a central processing unit for determining the actual spacing between successive ones of said eyemarks; and additional means for setting the predetermined nominal draw length for substantially equal to the actual spacing plus or minus a measured error quantity determined during the previous draw plus a portion of a scanning zone between successive ones of the eyemarks.*

*24. The invention set forth in claim 23 further comprising display means for indicating to an operator that the predetermined nominal draw length has been changed.*

*25. The invention set forth in claim 23 wherein said additional means calculates the average actual spacing between successive ones of a plurality of eyemarks and sets the predetermined nominal draw length to said average actual spacing.*

*26. The invention set forth in claim 25 wherein said additional means changes the predetermined nominal draw length only when the spacing between each of the successive ones of the plurality of eyemarks exceeds said predetermined difference.*

*27. A control system for controlling the operation of a machine of the type wherein a web, having regularly spaced eyemarks printed thereon, is advanced by a predetermined draw length and stopped and subsequently started, said control system comprising:*

*means for sensing the passage of an eyemark by a predetermined location;*

*means for determining the distance between the eyemark and the predetermined location when the web is stopped for cutting and sealing;*

*means for determining the actual spacing between adjacent ones of said eyemarks calculating the distance between adjacent ones of said eyemarks in accordance with the formula:*

$$PR=DL+Y-X$$

*where PR is the actual spacing between successive ones of the eyemarks, DL is the predetermined draw length, Y is the distance between an eyemark and the predetermined location when said web has been stopped and X is the distance between the next subsequent eyemark and the predetermined location during the next subsequent stopping of the web;*

*means for calculating the average actual spacing between the eyemarks over a predetermined number of consecutive eyemarks;*

*means for setting the subsequent predetermined draw length substantially equal to the average of said actual measured spacing plus or minus a measured error quantity determined during the previous draw plus a portion of a scanning zone between the eyemarks.*

*28. Means for advancing a web a desirable distance, said web having a plurality of regularly spaced eyemarks thereon, said means comprising:*

*a draw roll assembly operable to advance the web by a predetermined draw length;*

*an optical sensor operable to sense the passage of a printed eyemark by a predetermined location;*

*distance sensing means for sensing a deviation distance Y the sense printed eyemark has moved beyond said predetermined location when the web has been advanced by said predetermined draw length;*

*a first register operable to store said deviation distance Y;*

*a second register operable to store the next subsequent deviation distance X sensed by said distance sensing means:*

*first calculating means for calculating a printed eyemark repeat length in accordance with the formula;*

*print repeat length=DL+Y−X*

*wherein DL is the predetermined draw length;*

*second calculating means for calculating the average of a predetermined number of successive ones of said repeat lengths calculated by said first calculating means; and*

*control means for resetting the predetermined draw length to be substantially equal to said average repeat length calculated by said second calculating means.*

*29. The improvement as defined in claim 1 further comprising display means for indicating to an operator that the predetermined nominal draw length has been changed.*

* * * * *